US012396530B2

(12) United States Patent
Jin

(10) Patent No.: US 12,396,530 B2
(45) Date of Patent: Aug. 26, 2025

(54) EXTERNAL LAMP STRUCTURE

(71) Applicant: Linhai Zhongtian Electronic Appliance co.,ltd, Taizhou (CN)

(72) Inventor: Shimin Jin, Taizhou (CN)

(73) Assignee: Linhai Zhongtian Electronic Appliance co.,ltd, Taizhou (CN)

( * ) Notice: Subject to any disclaimer, the term of this patent is extended or adjusted under 35 U.S.C. 154(b) by 0 days.

(21) Appl. No.: 18/916,637

(22) Filed: Oct. 15, 2024

(65) Prior Publication Data

US 2025/0031813 A1 Jan. 30, 2025

(30) Foreign Application Priority Data

Feb. 4, 2024 (CN) ......................... 202420270579.2

(51) Int. Cl.

*F21S 4/20* (2016.01)
*A45B 3/04* (2006.01)
*F21V 19/00* (2006.01)
*F21V 19/04* (2006.01)

(52) U.S. Cl.

CPC .................. *A45B 3/04* (2013.01); *F21S 4/20* (2016.01); *F21V 19/004* (2013.01); *F21V 19/04* (2013.01); *A45B 2200/1018* (2013.01)

(58) Field of Classification Search

CPC ...... A45B 2200/1018; F21S 4/20; F21S 4/22; F21S 4/24; F21S 4/26; F21S 4/28

See application file for complete search history.

(56) References Cited

U.S. PATENT DOCUMENTS 11,098,861 B1 8/2021 Wang
2007/0189002 A1* 8/2007 Thode ...................... A45B 3/04 362/102

FOREIGN PATENT DOCUMENTS

CN 209594935 U 11/2019
WO 2015124121 A1 8/2015

* cited by examiner

*Primary Examiner* — Sean P Gramling

(57) ABSTRACT

An external lamp structure includes a light strip and two first fixing structures. The light strip is integrally formed or detachably connected with the two first fixing structures. The two first fixing structures are sleevedly provided on both ends of the light strip, respectively. The two first fixing structures are configured to mount the light strip on an umbrella structure.

19 Claims, 21 Drawing Sheets

EXTERNAL LAMP STRUCTURE

CROSS-REFERENCE TO RELATED APPLICATIONS

This application claims the benefit of priority from Chinese Patent Application No. 202420270579.2, filed on Feb. 4, 2024. The content of the aforementioned application, including any intervening amendments thereto, is incorporated herein by reference in its entirety.

TECHNICAL FIELD

This application relates to lighting facilities, and more particularly to an external lamp structure.

BACKGROUND

In the prior art, the light strip is fixed to the umbrella mainly through the following fixing methods. (1) A variety of lamps are directly fastened to an umbrella with a rope, which is not elegant and reliable. (2) For many low-end umbrellas, holes are made in their ribs for mounting the light strips, and the light is radiated through the holes. Such method has a main limitation that it is inconvenient for the users to replace the light strips in the case of failure. (3) Middle-end and high-end umbrellas generally use built-in light strips, which is beautiful but expensive, and the built-in light strips cannot be replaced in the case of failure.

SUMMARY

An object of this application is to provide an external lamp structure, so as to solve problems that it is required to select different light strips for different light-equipped parasols. This application has advantages of independent assembly and disassembly of light strips, convenient maintenance and repair, and elegant appearance and low cost, and is suitable for various grades of parasols.

In order to achieve the above objectives, the following technical solutions are adopted.

This application provides an external lamp structure, comprising:

a light strip; and two first fixing structures;

wherein the light strip is integrally formed or detachably connected with the two first fixing structures; one of the two first fixing structures is sleevedly provided on a first end of the light strip, and the other of the two first fixing structures is sleevedly provided on a second end of the light strip; and the two first fixing structures are configured to mount the light strip on an umbrella structure.

In an embodiment, the external lamp structure further comprises a second fixing structure; wherein the second fixing structure is sleevedly provided on a middle of the light strip; and the second fixing structure is configured to mount the light strip on the umbrella structure.

In an embodiment, each of the two first fixing structures comprises:

a first top plate;

a first bottom plate; and two first side plates;

wherein the two first side plates are arranged opposite to each other; a first side of the first top plate is connected with a top of one of the two first side plates, and a second side of the first top plate is connected with a top of the other of the two first side plates; a first side of the first bottom plate is connected with a bottom of one of the two first side plates, and a second side of the first bottom plate is connected with a bottom of the other of the two first side plates; the first top plate, the first bottom plate and the two first side plates are configured to form a first space; a first end of the first space is configured for a rib of the umbrella structure and the light strip to pass through, and a second end of the first space is configured for the rib of the umbrella structure to pass through.

In an embodiment, the first end of the first space is larger than the second end of the first space in size.

In an embodiment, the first top plate is provided with a positioning groove; the rib of the umbrella structure is provided with a first positioning hole corresponding to the positioning groove; and the positioning groove and the first positioning hole are configured to allow a first connecting structure to pass therethrough to realize a connection between each of the two first fixing structures and the rib of the umbrella structure.

In an embodiment, the first bottom plate is provided with a first protrusion; and the first protrusion is configured to limit the first end and the second end of the light strip.

In an embodiment, each of the two first fixing structures or the second fixing structure comprises:

a second top plate assembly;

a second bottom plate; and two second side plates;

wherein the two second side plates are arranged opposite to each other; a first side of the second top plate assembly is connected with a top of one of the two second side plates, and a second side of the second top plate assembly is connected with a top of the other of the two second side plates; a first side of the second bottom plate is connected with a bottom of one of the two second side plates, and a second side of the second bottom plate is connected with a bottom of the other of the two second side plates; and the second top plate assembly, the second bottom plate and the two second side plates are configured to form a second space configured for the rib of the umbrella structure and the light strip to pass through.

In an embodiment, a first open groove is provided between the second top plate assembly and each of the two second side plates.

In an embodiment, the second top plate assembly is provided with a first fastener assembly; the rib of the umbrella structure is provided with a second positioning hole; the first fastener assembly is configured to extend into the second positioning hole to realize connection of each of the two first fixing structures or the second fixing structure and the rib of the umbrella structure.

In an embodiment, the second top plate assembly comprises two second top plates; the first fastener assembly comprises two first fasteners; a first side of one of the second top plates is connected with the top of one of the two second side plates, and a first side of the other of the two second top plates is connected with the top of the other of the two second side plates; a first gap is provided between a second side of one of the two second top plates and a second side of the other of the two second top plates; one of the two first fasteners is provided on one of the two second top plates, and the other of the two first fasteners is provided on the other of the second top plates; a second gap is provided between the two first fasteners; the two first fasteners are configured to extend into the second positioning hole on the rib of the umbrella structure to realize the connection between each of the two first fixing structures or the second fixing structure and the rib of the umbrella structure.

In an embodiment, each of the two first fixing structures comprises:

a sliding block;

a third bottom plate; and two third side plates;

wherein the two third side plates are arranged opposite to each other; a first side of the third bottom plate is connected with a bottom of one of the two third side plates, and a second side of the third bottom plate is connected with a bottom of the other of the two third side plates; the third bottom plate and the two third side plates are configured to form a first U-shaped structure, and a sliding rail is provided in the first U-shaped structure; the sliding block is in slidable connection with the sliding rail; an end of the sliding rail and an end of the sliding block are configured to limit the first end and the second end of the light strip; the sliding block is provided with a second fastener; the rib of the umbrella structure is provided with a third positioning hole; the second fastener is configured to extend into the third positioning hole; the sliding block is provided with a first connecting hole; the rib of the umbrella structure is provided with a first fixing hole corresponding to the first connecting hole; and the first connecting hole and the first fixing hole are configured to allow a first rivet to pass therethrough.

In an embodiment, the end of the sliding block is provided with a flange.

In an embodiment, each of the two first fixing structures comprises:

a first fixing body; and a rotary fastener;

wherein the first fixing body is provided with a first clamping groove and a second clamping groove; the rotary fastener is in snap-fit connection with the first clamping groove; the light strip is located in the second clamping groove; the rotary fastener is provided with a second connecting hole; the rib of the umbrella structure is provided with a second fixing hole corresponding to the second connecting hole; and the second connecting hole and the second fixing hole are configured to allow a second rivet to pass therethrough.

In an embodiment, a side wall of the rotary fastener is provided with at least one stop block; an inner wall of the first clamping groove is provided with an annular clamping strip; and the annular clamping strip is provided with a notch, and the number of the notch is the same as the number of the at least one stop block.

In an embodiment, the rotary fastener is provided with a toggling part.

In an embodiment, a side of the toggling part away from the rotary fastener and facing toward a circumferential surface of the rotary fastener is provided with a bump.

In an embodiment, a first notch is formed between the bump and the rotary fastener.

In an embodiment, each of the at least one stop block is provided with a second protrusion; and the annular clamping strip is provided with a recess fitting the second protrusion.

In an embodiment, each of the two first fixing structures comprises a second fixing body; the second fixing body is provided with a third clamping groove; the light strip is located in the third clamping groove; the second fixing body is provided with a third connecting hole; the rib of the umbrella structure is provided with a fourth positioning hole corresponding to the third connecting hole; the third connecting hole and the fourth positioning hole are configured to allow a second connecting structure to pass therethrough to realize the connection between each of the two first fixing structures and the rib of the umbrella structure.

In an embodiment, each of the two first fixing structures or the second fixing structure comprises:

a fourth bottom plate; and two fourth side plates;

wherein the two fourth side plates are arranged opposite to each other; a first side of the fourth bottom plate is connected with a bottom of one of the two fourth side plates, and a second side of the fourth bottom plate is connected with a bottom of the other of the two fourth side plates; the fourth bottom plate and the two fourth side plates are configured to form a second U-shaped structure; an inner side of each of the two fourth side plates is provided with a third fastener, and the number of the third fastener is two; the third fastener of one of the two fourth side plates is close to a first end of the light strip, and the third fastener of the other of the two fourth side plates is close to a second end of the light strip; the rib of the umbrella structure is provided with a fifth positioning hole; and the third fastener is configured to extend into the fifth positioning hole to realize the connection of each of the two first fixing structures or the second fixing structure and the rib of the umbrella structure.

The present disclosure has the following beneficial effects.

The external lamp structure is provided. The light strip can be externally fixed on the rib of the umbrella, which solves problems that a parasol with lights needs to be mounted with different light strips. In addition, this application has advantages of independent disassembly and convenient maintenance, which is convenient for electrification of the parasol.

BRIEF DESCRIPTION OF THE DRAWINGS

To illustrate the technical solutions of the embodiments of this application or the prior art more clearly, the accompanying drawings required in the following description will be briefly introduced below. It is obvious that presented in the following accompanying drawings are only some embodiments of this application, and for those of ordinary skill in the art, other accompanying drawings can also be obtained according to these drawings without making creative effort.

Figure 1:
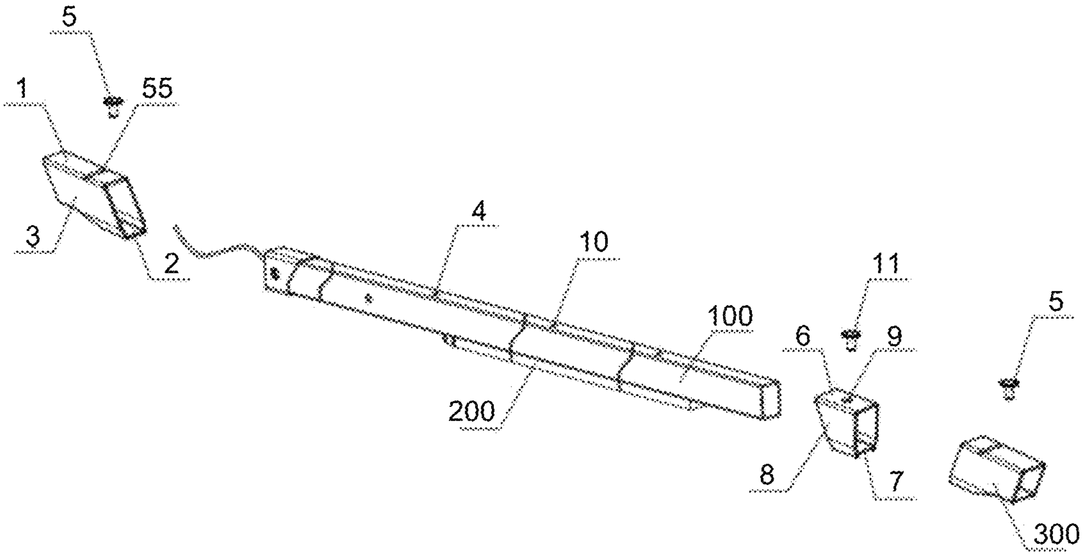
FIG. 1 is an exploded view of an external lamp structure according to Embodiment 1 of the present disclosure and a rib.

In the figures: 100, rib; 200, light strip; 300, first fixing structure; 400, second fixing structure; 1, first top plate; 2, first bottom plate; 3, first side plate; 4, first positioning hole; 5, first connecting structure; 6, third top plate; 7, fifth bottom plate; 8, fifth side plate; 9, fourth connecting hole; 10, sixth positioning hole; 11, second connecting structure; 12, second top plate assembly; 13, first limit plate; 14, second bottom plate; 15, second side plate; 16, first fastener assembly; 17, second positioning hole; 18, second top plate; 19, first fastener; 21, first protrusion; 22, first open groove; 23, flange; 27, sliding block; 28, third bottom plate; 29, third side plate; 30, sliding rail; 31, second fastener; 32, third positioning hole; 33, first fixing hole; 34, rivet; 35, first fixing body; 351, first clamping groove; 36, rotary fastener; 361, stop block; 3611, second protrusion; 362, toggling part; 3621, bump; 3622, first notch; 37, third clamping groove; 371, clamping strip; 3711, second notch; 3712, recess; 38, second connecting hole; 39, second fixing hole; 40, second fixing body; 41, rivet nut; 42, second clamping groove; 43, third connecting hole; 44, fourth positioning hole; 45, third connecting structure; 46, fourth bottom plate; 47, second limit plate; 48, fourth side plate; 49, third fastener; 50, fifth positioning hole; and 55, positioning groove.

DETAILED DESCRIPTION OF EMBODIMENTS

The technical solutions of the embodiments of the present disclosure will be clearly and completely described with reference to the accompanying drawings of the embodiments of the present disclosure. It is obvious that described herein are only some embodiments of the present disclosure, rather than all embodiments. Based on the embodiments of the present disclosure, other embodiments obtained by those of ordinary skill in the art without making creative effort shall fall within the scope of the present disclosure.

It should be noted that the terms, such as "up", "down", "left", "right", "front", "rear" and other directional indications used herein, are only used for illustrating relative position relationship and motion between components in a specific state (as shown in the accompanying drawings). If the specific state changes, the directional indication accordingly changes.

In addition, the terms "first" and "second" are only used for distinguishment rather than indicating or implying the relative importance or implicitly specifying the number of technical features indicated. Therefore, a feature defined with "first" or "second" may explicitly or implicitly indicates the inclusion of at least one of such features. Besides, the term "and/or" used herein includes three solutions, for example, "A" and/or "B" includes solution "A", solution "B", and a combination thereof. Technical solutions of embodiments can be combined with each other as long as the combined solution can be implemented by those skilled in the art. When a combination of the technical solutions is contradictory or cannot be realized, it should be considered that such a combination does not exist, and is not within the scope of the present disclosure.

An object of the present disclosure is to provide an external lamp structure, so as to solve problems that a parasol with lights needs to be mounted with different light strips. The present disclosure has advantages of independent disassembly, convenient maintenance, beauty and low cost, and is suitable for any grade of parasols.

To make the above object, features and advantages of the present disclosure more clearly, the present disclosure will be further described below with reference to the accompanying drawings and the specific embodiments.

Embodiment 1

Figure 2:
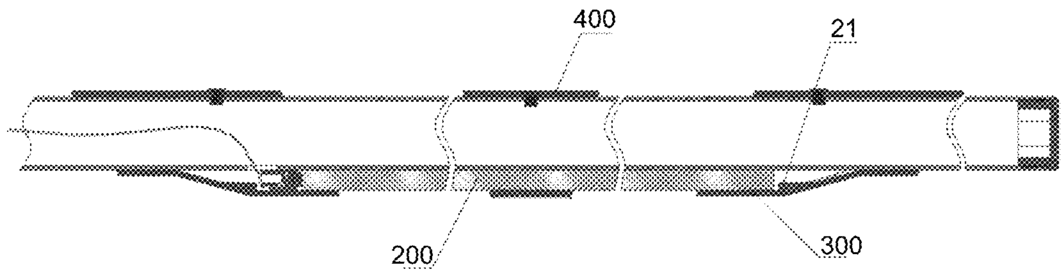
FIG. 2 is a sectional view of the external lamp structure according to Embodiment 1 of the present disclosure and the rib.
Figure 3:
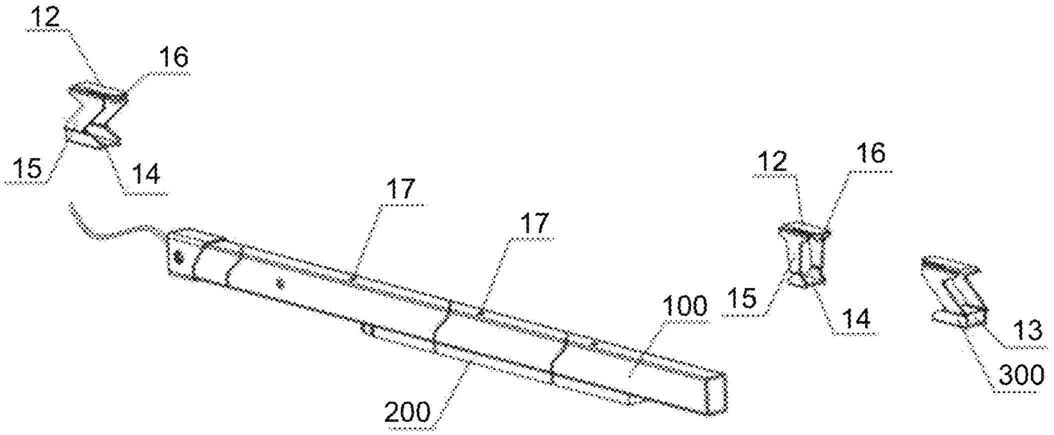
FIG. 3 is an exploded view of the external lamp structure according to Embodiment 2 of the present disclosure and the rib.
Figure 4:
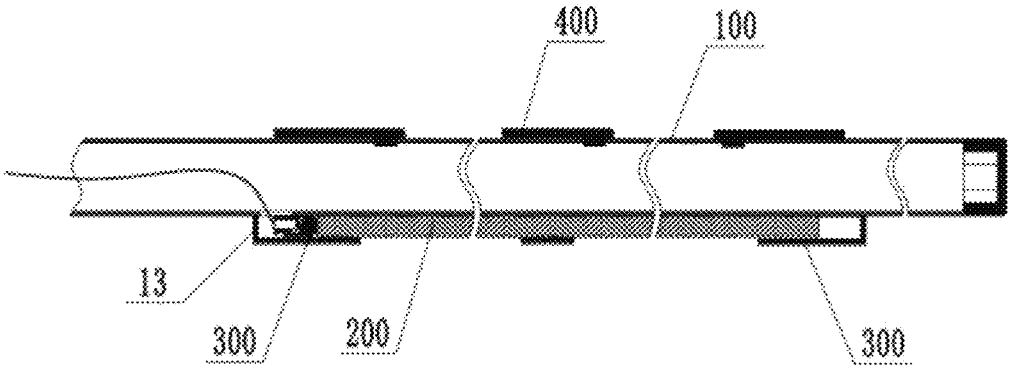
FIG. 4 is a sectional view of the external lamp structure according to Embodiment 2 of the present disclosure and the rib.

Referring to FIGS. 1-2, an external lamp structure is provided, including a light strip 200 and two first fixing structures 300. The light strip 200 is integrally formed or detachably connected with the two first fixing structures 300. Each of the two first fixing structures 300 is integrally formed. One of the two first fixing structures 300 is sleevedly provided on a first end of the light strip 200, and the other of the two first fixing structures 300 is sleevedly provided on a second end of the light strip 200. The two first fixing structures 300 are configured to mount the light strip 200 on an umbrella structure. The external lamp structure further includes a lamp line. A first end of the lamp line is connected with the light strip 200, and a second end of the lamp line passes through a line hole on a rib 100, extends in the rib 100, and is connected with a controller.

In this embodiment, each of the two first fixing structures 300 is made of a plastic material.

When the light strip 200 is relatively longer, the external lamp structure further includes a second fixing structure 400. The second fixing structure 400 is integrally formed, and is sleevedly provided on a middle of the light strip 200. The second fixing structure 400 is configured to mount the light strip 200 on the umbrella structure and prevent the light strip 200 from wearing.

In this embodiment, the second fixing structure 400 is made of the plastic material.

In this embodiment, each of the two first fixing structures 300 includes a first top plate 1, a first bottom plate 2 and two first side plates 3. The two first side plates 3 are arranged opposite to each other. A first side of the first top plate 1 is connected with a top of one of the two first side plates 3, and a second side of the first top plate 1 is connected with a top of the other of the two first side plates 3. A first side of the first bottom plate 2 is connected with a bottom of one of the two first side plates 3, and a second side of the first bottom plate 2 is connected with a bottom of the other of the two first side plates 3. The first top plate 1, the first bottom plate 2 and the two first side plates 3 are configured to form a first space. A first end of the first space is larger than a second end of the first space in size, so as to form a flared opening, which is configured to mount the light strip 200, and is convenient for each of the two first fixing structures 300 to be sleeved on the rib. The first end of the first space is configured for the rib 100 of the umbrella structure and the light strip 200 to pass through, and the second end of the first space is configured for the rib of the umbrella structure to pass through. The first bottom plate 2 is provided with a first protrusion 21 configured to limit the first end and the second end of the light strip 200. The first top plate 1 is provided with a positioning groove 55. The rib 100 is provided with a first positioning hole 4 corresponding to the positioning groove 55. The positioning groove 55 and the first positioning hole 4 are configured to allow a first connecting structure 5 to pass therethrough to realize a connection of each of the two first fixing structures 300 and the rib 100. The first connecting structure 5 is a screw, a rivet or a fastener. The first connecting structure 5 and the first positioning hole 4 are configured to limit the two first fixing structures 300 and prevent the two first fixing structures 300 from sliding on the rib, resulting in separation of the light strip 200.

In this embodiment, the second fixing structure 400 includes a third top plate 6, a fifth bottom plate 7 and two fifth side plates 8. The two fifth side plates 8 are arranged opposite to each other. A first side of the third top plate 6 is connected with a top of one of the two fifth side plates 8, and a second side of the third top plate 6 is connected with a top of the other of the two fifth side plates 8. A first side of the fifth bottom plate 7 is connected with a bottom of one of the two fifth side plates 8, and a second side of the fifth bottom plate 7 is connected with a bottom of the other of the two fifth side plates 8. The third top plate 6, the fifth bottom plate 7 and the two fifth side plate 8 are configured to form a third space configured for the rib 100 and the light strip 200 to pass through. The third top plate 6 is provided with a fourth connecting hole 9. The rib 100 is provided with a sixth positioning hole 10 corresponding to the fourth connecting hole 9. The fourth connecting hole 9 and the sixth positioning hole 10 are configured to allow a second connecting structure 11 to pass therethrough to realize a connection of the second fixing structure 400 and the rib 100. The second connecting structure 11 is the screw or the rivet. The second connecting structure 11 and the fourth connecting hole 9 are configured to limit the second fixing structures 400 and prevent the second fixing structures 400 from sliding on the rib.

In a case of use, each of the two first fixing structures 300 and the second fixing structure 400 are configured to be sleeved on the rib 100 through the first end and the second end of the rib 100. The connection of each of the two first fixing structures 300 and the rib 100 is realized by the screw, or the rivet or the fastener passing through the positioning groove 55 and the first positioning hole 4. The connection of the second fixing structure 400 and the rib 100 is realized by the screw, or the rivet passing through the fourth connecting hole 9 and the sixth positioning hole.

In this embodiment, the two first fixing structures 300 and the second fixing structure 400 adopt a fully enclosed structure, which has advantages of good stability, comprehensive protection and high reliability.

Embodiment 2

Referring to FIGS. 3-6, this embodiment is similar to Embodiment 1 except the following differences.

In this embodiment, each of the two first fixing structures 300 and the second fixing structure 400 includes a second top plate assembly 12, a second bottom plate 14 and two second side plates 15. The two second side plates 15 are arranged opposite to each other. A first side of the second top plate assembly 12 is connected with a top of one of the two second side plates 15, and a second side of the second top plate assembly 12 is connected with a top of the other of the two second side plates 15. A first open groove 22 is provided between the second top plate assembly 12 and each of the second side plates 15. A first side of the second bottom plate 14 is connected with a bottom of one of the two second side plates 15, and a second side of the second bottom plate 14 is connected with a bottom of the other of the two second side plates 15. The second top plate assembly 12, the second bottom plate 14 and the two second side plates 15 are configured to form a second space configured for the rib 100 and the light strip 200 to pass through. The second top plate assembly 12 is provided with a first fastener assembly 16. The rib 100 is provided with a second positioning hole 17. The first fastener assembly 16 is configured to extend into the second positioning hole 17 to realize a connection of each of the two first fixing structures 300 or the second fixing structure 400 and the rib 100. The first fastener assembly 16 and the second positioning hole 17 are configured to limit the two first fixing structures 300 and the second fixing structure 400 to prevent the two first fixing structures 300 and the second fixing structure 400 from sliding on the rib 100, resulting in separation of the light strip 200.

In this embodiment, the two first fixing structures 300 and the second fixing structure 400 also adopt the fully enclosed structure. Compared to Embodiment 1, in this embodiment, the first fastener assembly 16 and the two first fixing structures 300 are integrally formed, and the first fastener assembly 16 and the second fixing structure 400 are integrally formed, which has advantages of convenient installation.

Figure 5:
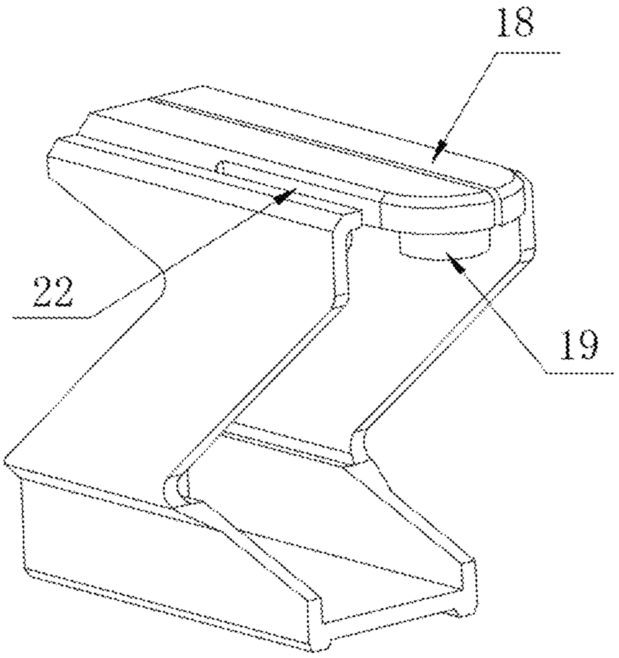
FIG. 5 is a structural diagram of a first fixing structure according to Embodiment 2 of the present disclosure.
Figure 6:
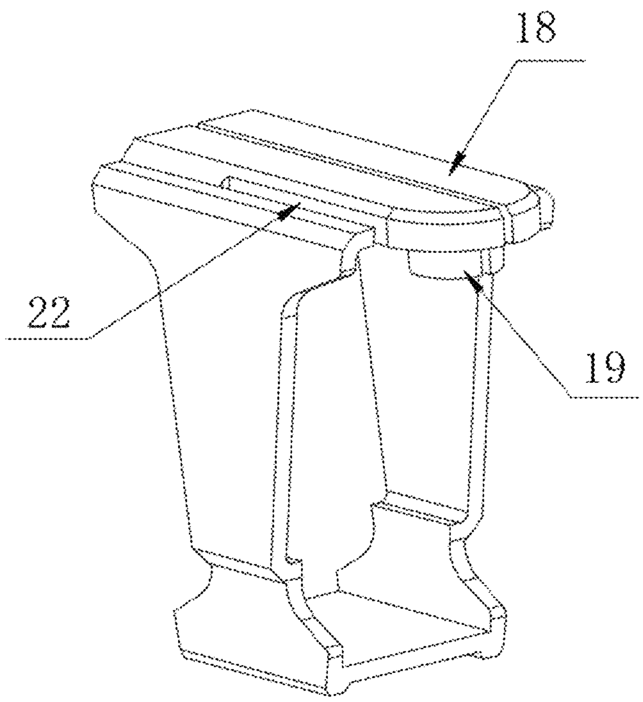
FIG. 6 is a structural diagram of a second fixing structure according to Embodiment 2 of the present disclosure.

Referring to FIGS. 5-6, on the basis of the first fixing structure 300 or the second fixing structure 400 according to Embodiment 1, in the first fixing structure 300 or the second fixing structure 400 in this embodiment, the second top plate assembly 12 includes two second top plates 18, and the first fastener assembly 16 includes two first fasteners 19. A first side of one of the second top plates 18 is connected with the top of one of the two second side plates 15, and a first side of the other of the second top plates 18 is connected with the top of the other of the two second side plates 15. A first gap is provided between a second side of one of the second top plates 18 and a second side of the other of the second top plates 18. One of the two first fasteners 19 is provided on one of the second top plates 18, and the other of the two first fasteners 19 is provided on the other of the second top plates 18. A second gap is provided between one of the two first fasteners 19 and the other of the two first fasteners 19. Each of the two first fasteners 19 is configured to extend into the second positioning hole 17 to realize the connection of each of the two first fixing structures or the second fixing structure and the rib 100.

During mounting, the two second side plates 15 are configured to be applied with a certain force to increase the first gap until the first gap is configured for the rib 100 to pass therethrough, so that the rib 100 is configured to enter the second space through the first gap, and the two first fasteners 19 are configured to be enclosed to form the first fastener assembly 16, which has a tightening effect on the light strip 200. The two first fasteners 19 are configured to be enclosed and insert into the second positioning hole 17 to complete installation of one of the two first fixing structures 300 or the second fixing structure 400.

Each of the two first fixing structures 300 further includes a first limit plate 13. The first limit plate 13 is connected with an end of the second top plate assembly 12, an end of the second bottom plate 14 and an end of each of the second side plates 15, respectively. The first limit plate 13 of one of the two first fixing structures 300 is located on an outer side of an end of the light strip 200, and the first limit plate 13 of the other of the two first fixing structures 300 is located on an outer side of the other end of the light strip 200. The first limit plate 13 is configured to limit the first end and the second end of the light strip 200.

During use, the two first fixing structures 300 and the second fixing structure 400 are configured to be sleeved on the rib 100. The first fastener assembly 16 is configured to extend into the second positioning hole 17 to realize the connection of each of the two first fixing structures or the second fixing structure and the rib 100. Or the two first fasteners 19 are configured to extend into the second positioning hole 17 to realize the connection of each of the two first fixing structures or the second fixing structure and the rib 100.

In this embodiment, the two first fixing structures 300 and the second fixing structure 400 adopt a fully enclosed structure with a first opening. Owing to the opening, the two first fixing structures 300 and the second fixing structure 400 do not need to be sleeved through both ends of the rib, which is convenient for installation.

Embodiment 3

Figure 7:
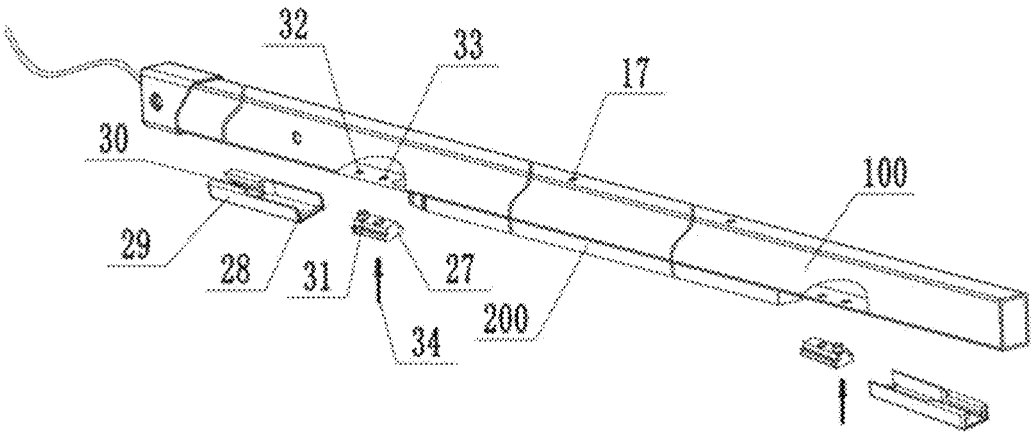
FIG. 7 is an exploded view of the external lamp structure according to Embodiment 3 of the present disclosure (without the second fixing structure) and the rib.
Figure 8:
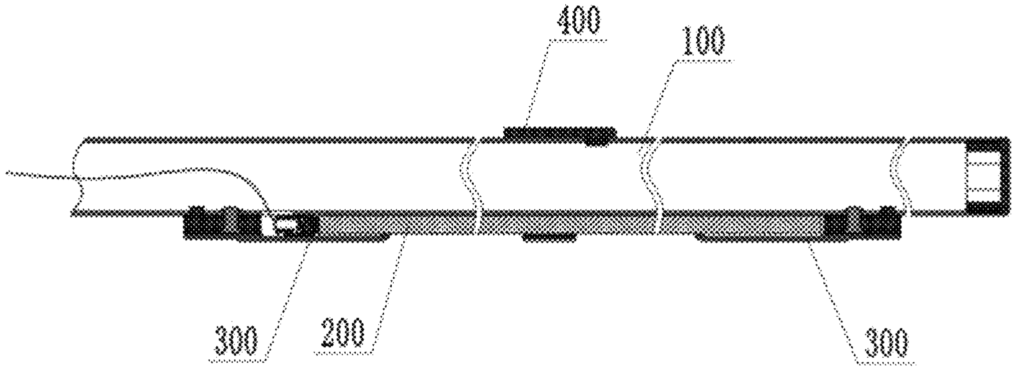
FIG. 8 is a sectional view of the external lamp structure according to Embodiment 3 of the present disclosure and the rib.
Figure 9:
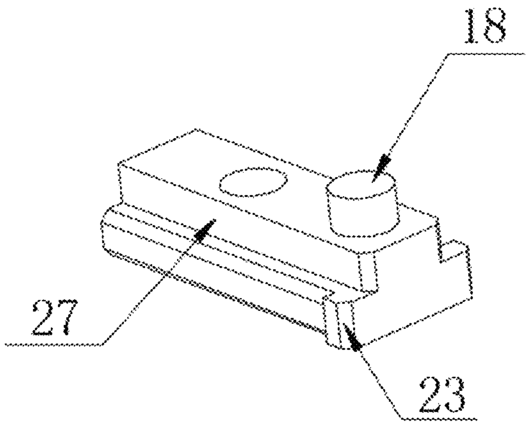
FIG. 9 is a structural diagram of a sliding block according to an embodiment of the present disclosure.
Figure 10:
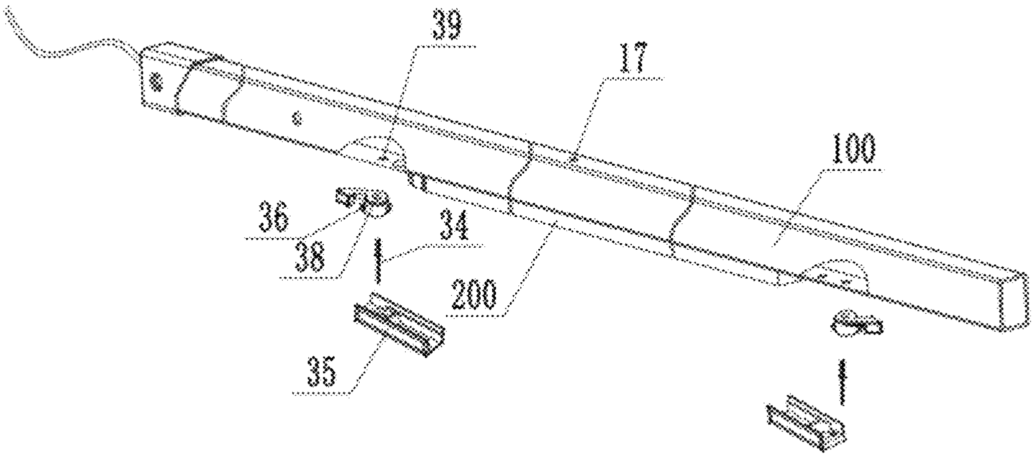
FIG. 10 is an exploded view of the external lamp structure according to Embodiment 4 of the present disclosure (without the second fixing structure) and the rib.
Figure 11:
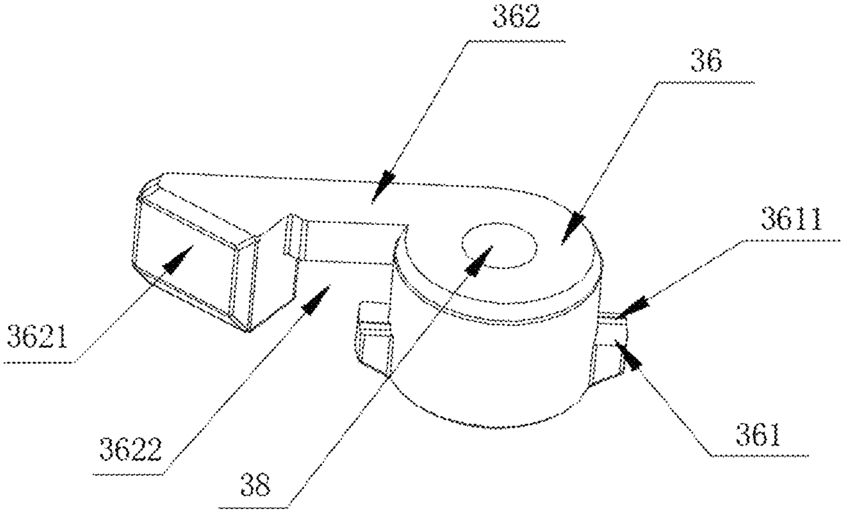
FIG. 11 is a structural diagram of a rotary fastener according to an embodiment of the present disclosure.
Figure 12:
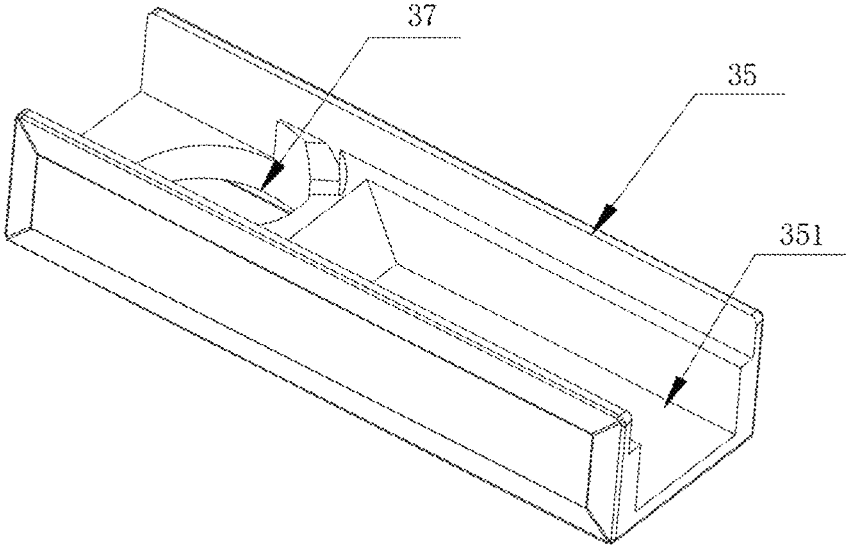
FIG. 12 is a front view of a first fixing body according to an embodiment of the present disclosure.
Figure 13:
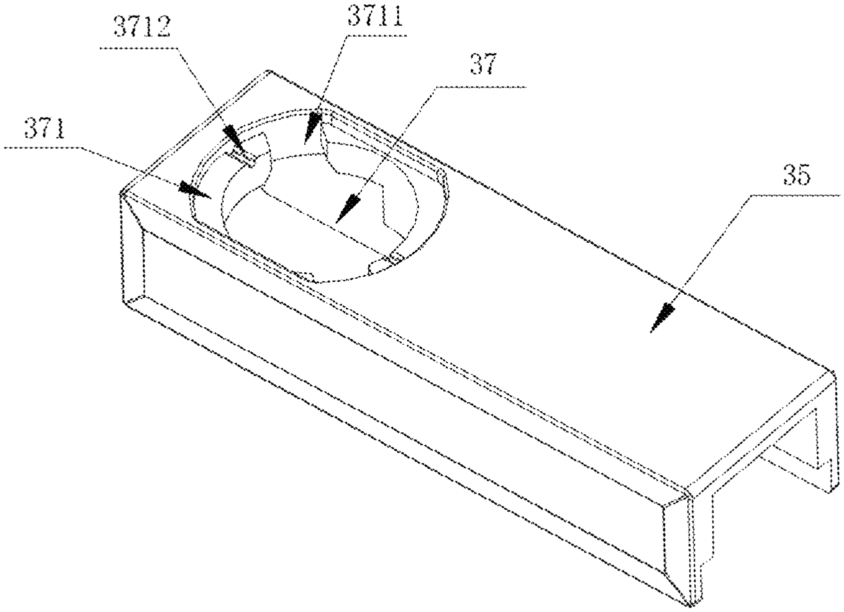
FIG. 13 is a rear view of the first fixing body according to Embodiment 4 of the present disclosure.
Figure 14:
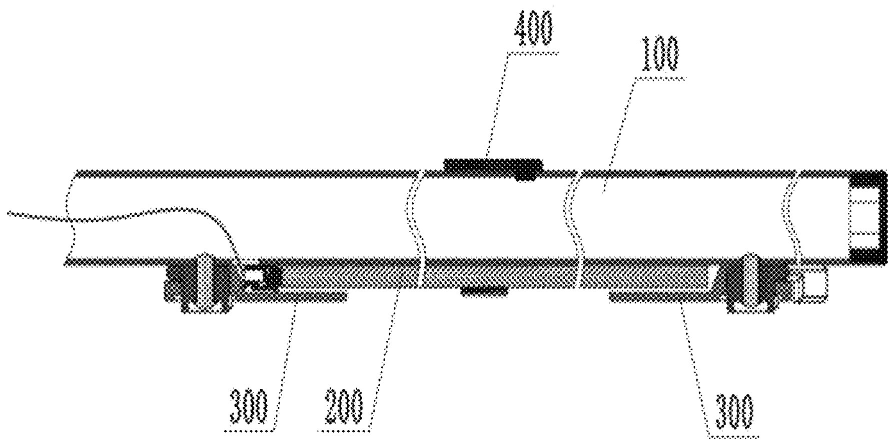
FIG. 14 is a sectional view of the external lamp structure according to Embodiment 4 of the present disclosure and the rib.

Referring to FIGS. 7-9, this embodiment is similar to Embodiment 2 except the following differences.

In this embodiment, each of the two first fixing structures 300 includes a sliding block 27, a third bottom plate 28 and two third side plates 29. The two third side plates 29 are arranged opposite to each other. A first side of the third bottom plate 28 is connected with a bottom of one of the two third side plates 29, and a second side of the third bottom plate 28 is connected with a bottom of the other of the two third side plates 29. The third bottom plate 28 and the two third side plates 29 are configured to form a first U-shaped structure, and a sliding rail 30 is provided in the first U-shaped structure. The sliding block 27 is in slidable connection with the sliding rail 30. The sliding block 27 is configured as a stator, and the first U-shaped structure is configured as a mover. An end of the sliding rail 30 and an end of the sliding block 27 are configured to limit the first end and the second end of the light strip 200. The rib 100 is provided with a third positioning hole 32. The sliding block 27 is provided with a second fastener 31 configured to extend into the third positioning hole 32. The sliding block 27 is provided with a first connecting hole. The rib 100 is provided with a first fixing hole 33 corresponding to the first connecting hole. The first connecting hole and the first fixing hole 33 are configured to allow a rivet 34 to pass therethrough.

In this embodiment, the end of the sliding block 27 is provided with a flange 23. The flange 23 is configured to limit and position the two first fixing structures 300, so that each of the two first fixing structures 300 can slide quickly to a specified position and be limited, and will not be separates from the other end of the sliding block 27.

During use, the second fastener 31 is configured to extend into the third positioning hole 32 to connect the sliding block 27 and the rib 100. The rivet 34 is configured to pass through the first connecting hole and the first fixing hole 33 to realize a connection of the slicing block 27 and the rib 100. Then the mover is configured to be pushed to realize a snap-fit connection of the sliding block 27 and the mover, so as to realize the connection of the two first fixing structures 300 and the rib 100. The connection of the second fixing structure 400 and the rib 100 is the same as that in Embodiment 2.

In this embodiment, the two first fixing structures 300 adopt a sliding cover structure, so that the two first fixing structures 300 are not limited to a size of the rib 100, and can be adapted to the rib 100 with multiple sizes. In addition, the light strip 200 can be assembled and disassembled by sliding the two first fixing structures 300, which is convenient and fast.

Embodiment 4

Referring to FIGS. 10-14, this embodiment is similar to Embodiment 2 except the following differences.

In this embodiment, each of the two first fixing structures 300 includes a first fixing body 35 and a rotary fastener 36. The first fixing body 35 is provided with a third clamping groove 37 and a first clamping groove 351. The rotary fastener 36 is in snap-fit connection with the third clamping groove 37. The light strip 200 is located in the first clamping groove 351. The rotary fastener 36 is provided with a second connecting hole 38. The rib 100 is provided with a second fixing hole 39 corresponding to the second connecting hole 38. The second connecting hole 38 and the second fixing hole 39 are configured to allow the rivet 34 to pass therethrough.

In this embodiment, the first fixing body 35 has a long strip-shaped groove structure with openings on both ends. The third clamping groove 37 is arranged on a first end of an inner bottom surface of the first fixing body 35, and the first clamping groove 351 is arranged on a second end the inner bottom surface of the first fixing body 35. The third clamping groove 37 is vertical to a bottom surface of the first fixing body 35. The first clamping groove 351 is a rectangular groove. An end of the first clamping groove 351 away from the third clamping groove 37 is provided with a second opening. The rotary fastener 36 is cylindrical, and the third clamping groove 37 is round, which is fitting the rotary fastener 36. In this embodiment, the third clamping groove 37 is configured to pass through a bottom of the first fixing body 35. A cross section of the first clamping groove 351 is U-shaped, which is fitting the light strip 200.

In this embodiment, a circumference of the rotary fastener 36 is provided with at least one stop block 361. An inner wall of the third clamping groove 37 is provided with an annular clamping strip 371. The annular clamping strip 371 is provided with a second notch 3711, and the number of the second notch 3711 is the same as the number of the at least one stop block 361. When the number of the at least one stop block 361 is one, the one stop block 361 is arranged on the circumference of the rotary fastener 36. When the number of the at least one stop block 361 is at least two, the at least two stop block 361 are arranged on the circumference of the rotary fastener 36 in a circular array.

In this embodiment, the rotary fastener 36 is provided with a toggling part 362. The toggling part 362 is configured to drive the rotary fastener 36 to rotate, and the toggling part 362 is in a strip shape. In an embodiment, the toggling part 362 is arranged along a tangential direction of the rotary fastener 36. The toggling part 362 is configured to be parallel to the at least one stop block 361. A side of the toggling part 362 away from the rotary fastener 36 and facing toward the circumferential surface of the rotary fastener 36 is provided with a bump 3621. The bump 3621 is trilateral. The bump 3621 is configured to facilitate driving the toggling part 362, and a first notch 3622 is formed between the bump 3621 and the rotary fastener 36.

In this embodiment, the at least one stop block 361 is provided with a second protrusion 3611, and the annular clamping strip 371 is provided with a recess 3712 fitting the second protrusion 3611. In an embodiment, each of the at least one stop block 361 is arranged on a lower part of the rotary fastener 36. The second protrusion 3611 is arranged on a top surface of each of the at least one stop block 361. The second protrusion 3611 is in the strip shape and is arranged parallel to the toggling part 362. The recess 3712 is arranged on a back of the first fixing body 35, and is in the strip shape. The recess 3712 is arranged parallel to a length direction of the first fixing body 35. The second notch 3711 is arranged on the annular clamping strip 371 deviated from the recess 3712. The first notch 3622 is configured for a side wall of the first fixing body 35 to insert into the first notch 3622 after fixing of the first fixing body 35 by the rotary fastener 36. At this moment, the first notch 3622 is in snap-fit connection with the side wall of the first fixing body 35, which can further improve an effect of installation and fixing.

During use, the rivet 34 is configured to mount the rotary fastener 36 on the rib 100, and the third clamping groove 37 is fastened on the rotary fastener 36. The first clamping groove 351 is configured to support the first end and the second end of the light strip 200. The rotary fastener 36 is configured to be rotated to be in snap-fit connection with the third clamping groove 37 to realize the connection of the two first fixing structures 300 and the rib 100. The connection of the second fixing structure 400 and the rib 100 is the same as that in Embodiment 2.

In an embodiment, during mounting, the light strip 200 is configured to be accommodated in the first clamping groove 351. Then the rotary fastener 36 is configured to be aligned with the third clamping groove 37 and inserted into the third clamping groove 37, so that each of the at least one stop block 361 is configured to be inserted into the second notch 3711 from top to bottom and pass through the annular clamping strip 371. Then the toggling part 362 is configured to be applied with an external force to drive the rotary fastener 36 to rotate. The rotary fastener 36 is configured to rotate to drive the at least one stop block 361. When each of the at least one stop block 361 rotates to reach a position below the annular clamping strip 371, the annular clamping strip 371 is configured to limit the at least one stop block 361. The rotary fastener 36 is configured to drive the second protrusion 3611 to synchronously rotate. At this moment, the second protrusion 3611 slides in a bottom surface of the annular clamping strip 371. When the second protrusion 3611 slides into the recess 3712, the recess 3712 is configured to clamp the second protrusion 3611 to limit rotation of the rotary fastener 36. The mounting of the two first fixing structures 300 is completed.

In this embodiment, the two first fixing structures 300 adopt a rotary disassembly structure, which is not limited to the size of the rib 100. In addition, the rotary fastener 36 is configured to assemble and disassemble the light strip, which is convenient and fast.

Embodiment 5

Figure 15:
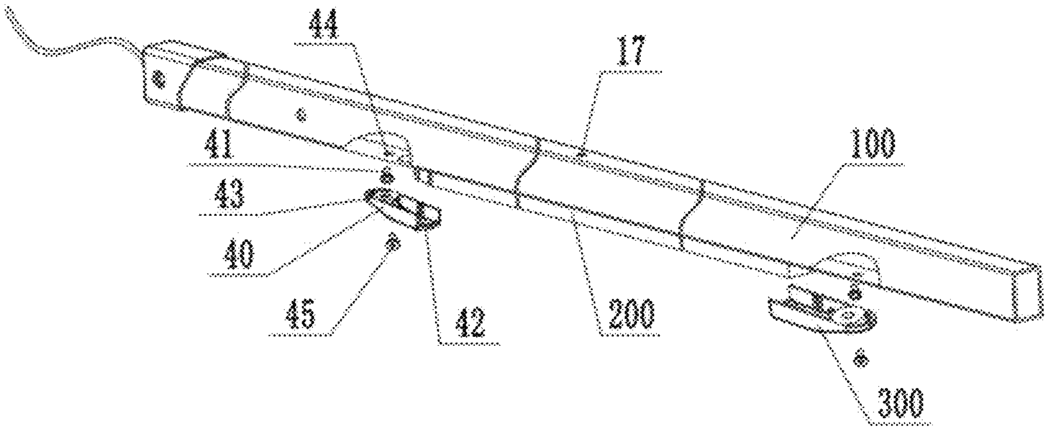
FIG. 15 is an exploded view of the external lamp structure according to Embodiment 5 of the present disclosure (without the second fixing structure) and the rib.
Figure 16:
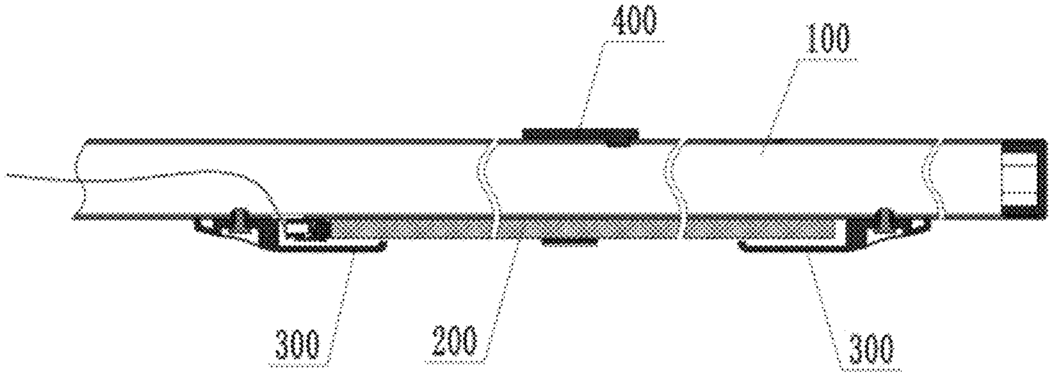
FIG. 16 is a sectional view of the external lamp structure according to Embodiment 5 of the present disclosure and the rib.

Referring to FIGS. 15-16, this embodiment is similar to Embodiment 2 except the following differences.

In this embodiment, each of the two first fixing structures 300 includes a second fixing body 40 and a rivet nut 41. The second fixing body 40 is provided with a second clamping groove 42. The light strip 200 is located in the second clamping groove 42. The second fixing body 40 is provided with a third connecting hole 43. The rib 100 is provided with a fourth positioning hole 44 corresponding to the third connecting hole 43. The rivet nut 41 is located in the fourth positioning hole 44, the third connecting hole 43 is configured to allow a third connecting structure 45 to pass therethrough to realize the connection of each of the two first fixing structures 300 and the rib 100. The third connecting structure 45 is the screw, the fastener or the rivet.

During use, the light strip 200 is configured to be in snap-fit connection with the second clamping groove 42. Then the second fixing body 40 is connected with the rivet nut 41 through the screw, or the fastener or the rivet, to realize the connection of each of the two first fixing structures 300 and the rib 100. The connection of the second fixing structure 400 and the rib 100 is the same as Embodiment 2.

In this embodiment, the two first fixing structures 300 adopt a cover plate structure, which is not limited to the size of the rib, and has a simple structure and good stability.

Embodiment 6

Figure 17:
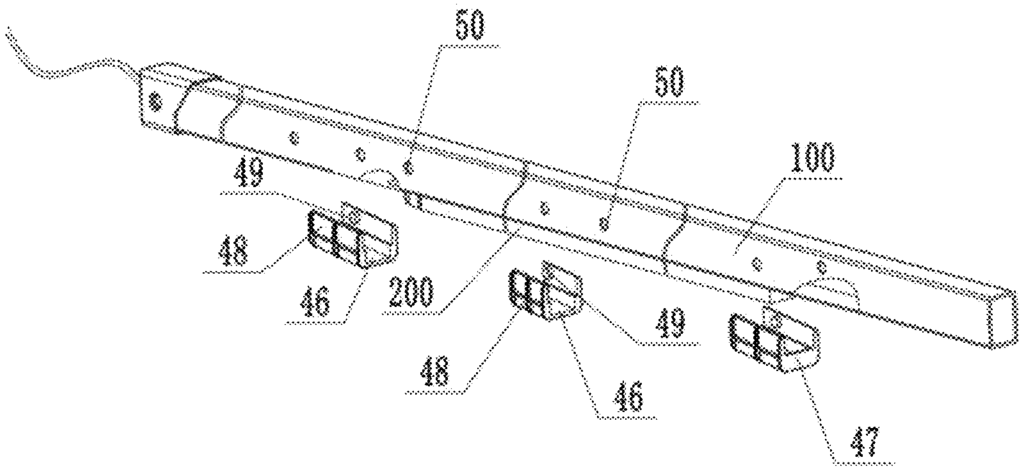
FIG. 17 is an exploded view of the external lamp structure according to Embodiment 6 of the present disclosure and the rib.
Figure 18:
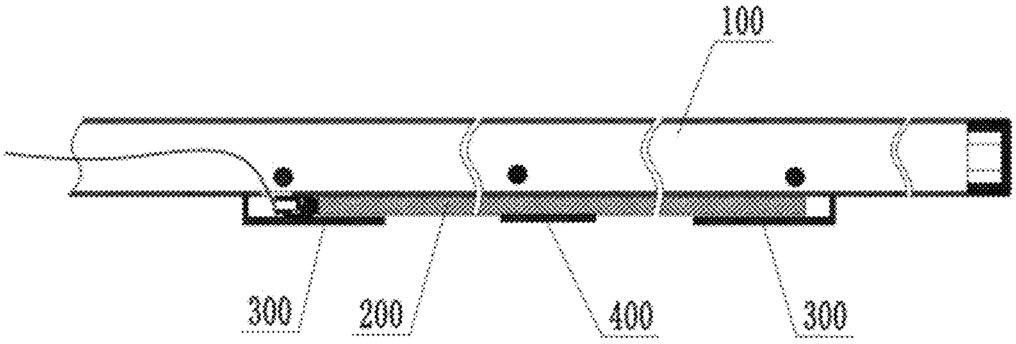
FIG. 18 is a sectional view of the external lamp structure according to Embodiment 6 of the present disclosure and the rib.

Referring to FIGS. 17-18, this embodiment is similar to Embodiment 1 except the following differences.

In this embodiment, each of the two first fixing structures 300 or the second fixing structure 400 includes a fourth bottom plate 46 and two fourth side plates 48. The two fourth side plates 48 are arranged opposite to each other. A first side of the fourth bottom plate 46 is connected with a bottom of one of the two fourth side plates 48, and a second side of the fourth bottom plate 46 is connected with a bottom of the other of the two fourth side plates 48. The fourth bottom plate 46 and the two fourth side plates 48 are configured to form a second U-shaped structure. An inner side of each of the two fourth side plates 48 includes a third fastener 49. The third fastener 49 of one of the two fourth side plates 48 is close to the first end of the light strip 200, and the third fastener 49 of the other of the two fourth side plates 48 is close to the second end of the light strip 200. The rib 100 is provided with a fifth positioning hole 50. The third fastener 49 is configured to extend into the fifth positioning hole 50 to realize the connection of each of the two first fixing structures 300 or the second fixing structure and the rib 100. Each of the two first fixing structures 300 includes a second limit plate 47. The second limit plate 47 is connected with an end of the fourth bottom plate 46, an end of one of the two fourth side plates 48 and an end of the other of the two fourth side plates 48, respectively. The second limit plate 47 of one of the two fourth side plates 48 is located on an outer side of the first end of the light strip 200, and the second limit plate 47 of the other of the two fourth side plates 48 is located on an outer side of the second end of the light strip 200.

During use, an upper opening of each of the two first fixing structures 300 is configured to be aligned with the rib 100, and is configured to be pushed from bottom to top. When the third fastener 49 is aligned with the fifth positioning hole 50, and inserts into the fifth positioning hole 50, the connection of the each of the two first fixing structures 300 or the second fixing structure 400 and the rib 100 is realized.

In this embodiment, the two first fixing structures 300 and the second fixing structure 400 adopt a semi-enclosed structure with an opening, such that the two first fixing structures 300 and the second fixing structure 400 do not need to be sleeved through both ends of the rib, which is convenient for installation.

Figure 19:
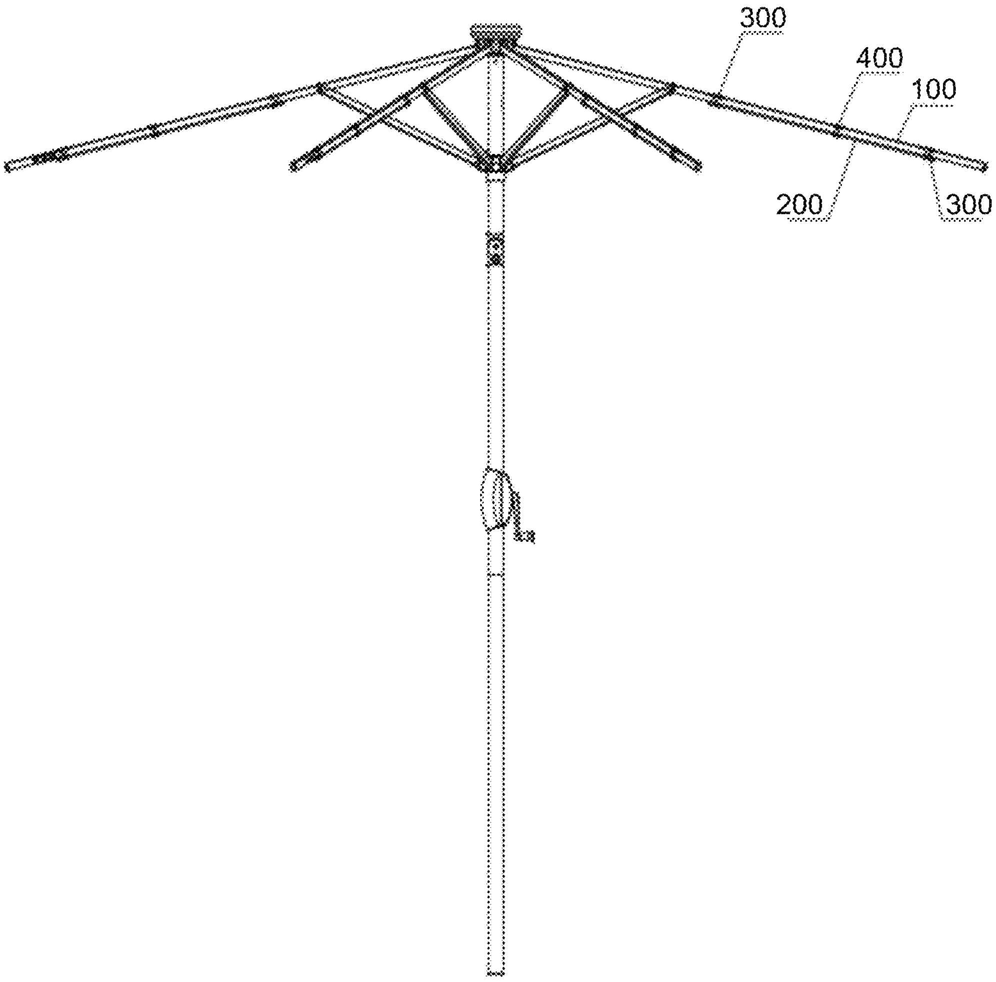
FIG. 19 schematically shows the external lamp structure according to an embodiment of the present disclosure assembled on a middle-column umbrella.
Figure 20:
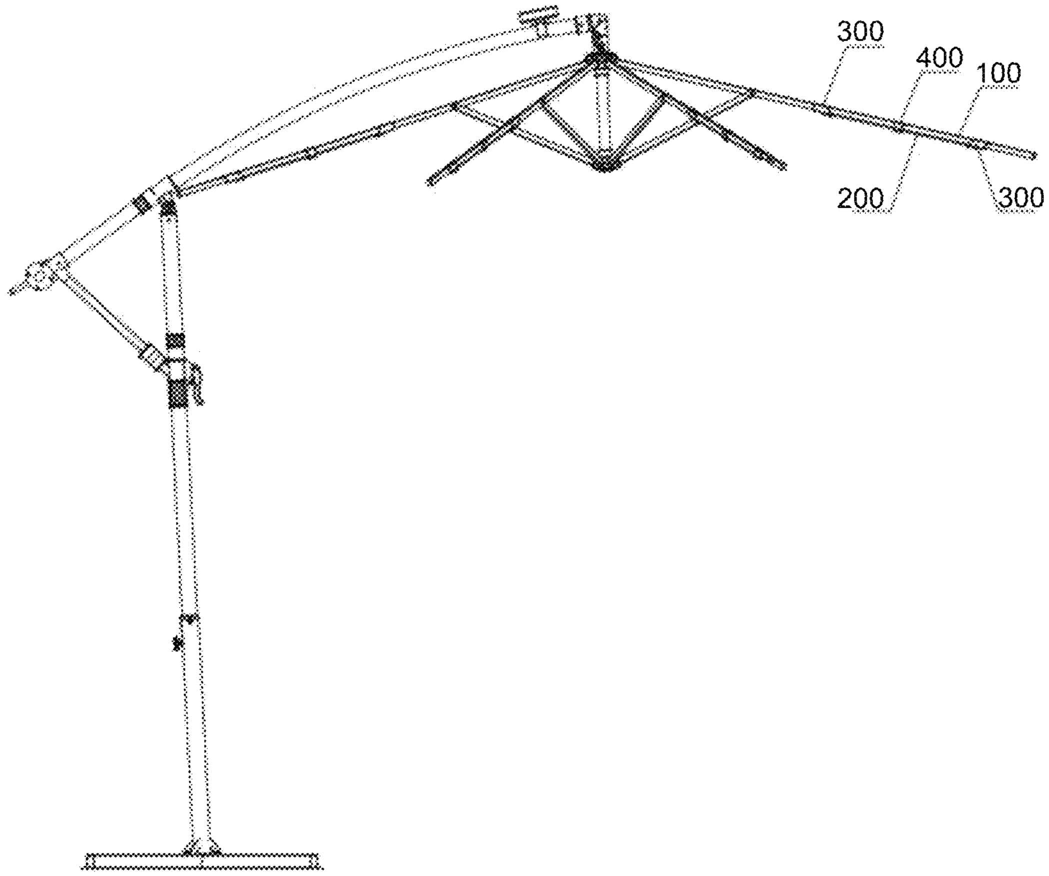
FIG. 20 schematically shows the external lamp structure according to an embodiment of the present disclosure assembled on a banana umbrella.
Figure 21:
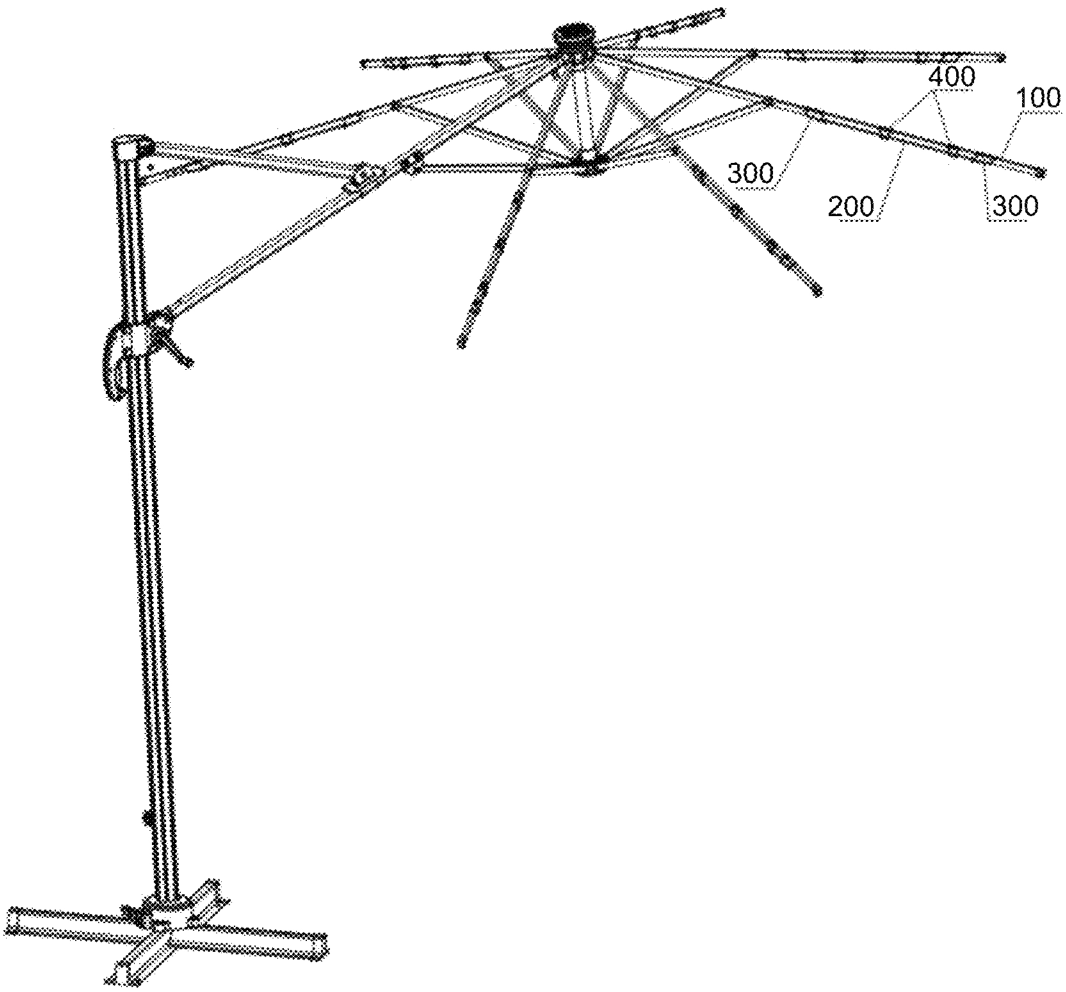
FIG. 21 schematically shows the external lamp structure according to an embodiment of the present disclosure assembled on a roman umbrella.

Referring to FIGS. 19-21, which show applications of the external lamp structure of the present disclosure, the light strip 200 can be a light guide strip or a rope light. The external lamp structure can be applied on a central pole umbrella, a banana umbrella, a roman umbrella and other umbrella structures.

This embodiment discloses the external lamp structure, so that the light strip 200 can be externally arranged on the rib 100, which solves the problem that a parasol with lights needs to be mounted with different light strips 200. In addition, this application has advantages of independent disassembly of the light strip 200 and convenient maintenance, which is convenient for electrification of the parasol.

The principle and implementation of this application have been described with reference to embodiments. The above embodiments are only for illustrating the method and the core idea of this application, are not intended to limit this application. It should be understood that various modifications, variations and replacements made by those of ordinary skill in the art without departing from the spirit of this application shall fall within the scope of this application defined by the appended claims.

What is claimed is:

1. An external lamp structure, comprising:

a light strip; and two first fixing structures;

wherein the light strip is integrally formed or detachably connected with the two first fixing structures; one of the two first fixing structures is sleevedly provided on a first end of the light strip, and the other of the two first fixing structures is sleevedly provided on a second end of the light strip; and the two first fixing structures are configured to mount the light strip on an umbrella structure; and each of the two first fixing structures comprises a top plate, a bottom plate and two side plates; the two side plates are arranged opposite to each other; a first side of the top plate is connected with a top of one of the two side plates, and a second side of the top plate is connected with a top of the other of the two side plates; a first side of the bottom plate is connected with a bottom of one of the two side plates, and a second side of the bottom plate is connected with a bottom of the other of the two side plates; the top plate, the bottom plate and the two side plates are configured to form a space; a first end of the space is configured for a rib of the umbrella structure and the light strip to pass through, and a second end of the space is configured for the rib of the umbrella structure to pass through.

2. The external lamp structure of claim 1, further comprising:

a second fixing structure;

wherein the second fixing structure is sleevedly provided on a middle of the light strip; and the second fixing structure is configured to mount the light strip on the umbrella structure.

3. The external lamp structure of claim 1, wherein the first end of the space is larger than the second end of the space in size.

4. The external lamp structure of claim 1, wherein the top plate is provided with a positioning groove; the rib of the umbrella structure is provided with a positioning hole corresponding to the positioning groove; and the positioning groove and the positioning hole are configured to allow a connecting structure to pass therethrough to realize connection between each of the two first fixing structures and the rib of the umbrella structure.

5. The external lamp structure of claim 1, wherein the bottom plate is provided with a protrusion; and the protrusion is configured to limit the first end and the second end of the light strip.

6. The external lamp structure of claim 2, wherein each of the two first fixing structures or the second fixing structure comprises:

a top plate assembly;

a bottom plate; and two side plates;

wherein the two side plates are arranged opposite to each other; a first side of the top plate assembly is connected with a top of one of the two side plates, and a second side of the top plate assembly is connected with a top of the other of the two side plates; a first side of the bottom plate is connected with a bottom of one of the two side plates, and a second side of the bottom plate is connected with a bottom of the other of the two side plates; and the top plate assembly, the bottom plate and the two side plates are configured to form a space configured for a rib of the umbrella structure and the light strip to pass through.

7. The external lamp structure of claim 6, wherein an open groove is provided between the top plate assembly and each of the two side plates.

8. The external lamp structure of claim 6, wherein the top plate assembly is provided with a fastener assembly; the rib of the umbrella structure is provided with a positioning hole; the fastener assembly is configured to extend into the positioning hole to realize connection between each of the two first fixing structures or the second fixing structure and the rib of the umbrella structure.

9. The external lamp structure of claim 8, wherein the top plate assembly comprises two top plates; the fastener assembly comprises two fasteners; a first side of one of the two top plates is connected with the top of one of the two side plates, and a first side of the other of the two top plates is connected with the top of the other of the two side plates; a first gap is provided between a second side of one of the two top plates and a second side of the other of the two top plates; one of the two fasteners is provided on one of the two top plates, and the other of the two fasteners is provided on the other of the two top plates; a second gap is provided between the two fasteners; the two fasteners are configured to extend into the positioning hole on the rib of the umbrella structure to realize the connection between each of the two first fixing structures or the second fixing structure and the rib of the umbrella structure.

10. The external lamp structure of claim 1, wherein each of the two first fixing structures comprises a fixing body; the fixing body is provided with a clamping groove; the light strip is located in the clamping groove; the fixing body is provided with a connecting hole; a rib of the umbrella structure is provided with a positioning hole corresponding to the connecting hole; the connecting hole and the positioning hole are configured to allow a connecting structure to pass therethrough to realize connection between each of the two first fixing structures and the rib of the umbrella structure.

11. The external lamp structure of claim 2, wherein each of the two first fixing structures or the second fixing structure comprises:

a bottom plate; and two side plates;

wherein the two side plates are arranged opposite to each other; a first side of the bottom plate is connected with a bottom of one of the two side plates, and a second side of the bottom plate is connected with a bottom of the other of the two side plates; the bottom plate and the two side plates are configured to form a U-shaped structure; an inner side of each of the two side plates is provided with a fastener; a rib of the umbrella structure is provided with a positioning hole; and the fastener is configured to extend into the positioning hole to realize connection between each of the two first fixing structures or the second fixing structure and the rib of the umbrella structure.

12. An external lamp structure, comprising:

a light strip; and two fixing structures;

wherein the light strip is integrally formed or detachably connected with the two fixing structures; one of the two fixing structures is sleevedly provided on a first end of the light strip, and the other of the two fixing structures is sleevedly provided on a second end of the light strip; and the two fixing structures are configured to mount the light strip on an umbrella structure; and each of the two fixing structures comprises a sliding block, a bottom plate and two side plates; the two side plates are arranged opposite to each other; a first side of the bottom plate is connected with a bottom of one of the two side plates, and a second side of the bottom plate is connected with a bottom of the other of the two side plates; the bottom plate and the two side plates are configured to form a U-shaped structure, and a sliding rail is provided in the U-shaped structure; the sliding block is in slidable connection with the sliding rail; an end of the sliding rail and an end of the sliding block are configured to limit the first end and the second end of the light strip; the sliding block is provided with a fastener; a rib of the umbrella structure is provided with a positioning hole; the fastener is configured to extend into the positioning hole; the sliding block is provided with a connecting hole;

the rib of the umbrella structure is provided with a fixing hole corresponding to the connecting hole; and the connecting hole and the fixing hole are configured to allow a rivet to pass therethrough.

13. The external lamp structure of claim 12, wherein the end of the sliding block is provided with a flange.

14. An external lamp structure, comprising:

a light strip; and two fixing structures;

wherein the light strip is integrally formed or detachably connected with the two fixing structures; one of the two fixing structures is sleevedly provided on a first end of the light strip, and the other of the two fixing structures is sleevedly provided on a second end of the light strip; and the two fixing structures are configured to mount the light strip on an umbrella structure; and each of the two fixing structures comprises a fixing body and a rotary fastener; wherein the fixing body is provided with a first clamping groove and a second clamping groove; the rotary fastener is in snap-fit connection with the first clamping groove; the light strip is located in the second clamping groove; the rotary fastener is provided with a connecting hole; a rib of the umbrella structure is provided with a fixing hole corresponding to the connecting hole; and the connecting hole and the fixing hole are configured to allow a rivet to pass therethrough.

15. The external lamp structure of claim 14, wherein a side wall of the rotary fastener is provided with at least one stop block; an inner wall of the first clamping groove is provided with an annular clamping strip; and the annular clamping strip is provided with a notch, and the number of the notch is the same as the number of the at least one stop block.

16. The external lamp structure of claim 15, wherein the rotary fastener is provided with a toggling part.

17. The external lamp structure of claim 16, wherein a side of the toggling part away from the rotary fastener and facing toward a circumferential surface of the rotary fastener is provided with a bump.

18. The external lamp structure of claim 17, wherein a notch is formed between the bump and the rotary fastener.

19. The external lamp structure of claim 15, wherein each of the at least one stop block is provided with a protrusion; and the annular clamping strip is provided with a recess fitting the protrusion.

* * * * *